(12) United States Patent
Ren et al.

(10) Patent No.: US 11,528,099 B2
(45) Date of Patent: Dec. 13, 2022

(54) COMMUNICATION METHOD AND APPARATUS

(71) Applicant: HUAWEI TECHNOLOGIES CO., LTD., Guangdong (CN)

(72) Inventors: Haibao Ren, Shanghai (CN); Huiying Zhu, Shanghai (CN); Jinyao Liang, Shenzhen (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 228 days.

(21) Appl. No.: 16/786,592

(22) Filed: Feb. 10, 2020

(65) Prior Publication Data
US 2020/0177320 A1 Jun. 4, 2020

Related U.S. Application Data

(63) Continuation of application No. PCT/CN2018/099705, filed on Aug. 9, 2018.

(30) Foreign Application Priority Data

Aug. 11, 2017 (CN) .......................... 201710687955.2

(51) Int. Cl.
*H04L 1/00* (2006.01)
*H04L 1/18* (2006.01)
(Continued)

(52) U.S. Cl.
CPC .......... *H04L 1/1819* (2013.01); *H04L 1/0643* (2013.01); *H04L 1/1893* (2013.01);
(Continued)

(58) Field of Classification Search
CPC ... H04L 1/1819; H04L 1/0643; H04L 1/1893; H04L 1/1896; H04L 5/0055;
(Continued)

(56) References Cited

U.S. PATENT DOCUMENTS

| 9,060,306 B2* | 6/2015 | Cedergren | ............ H04L 5/0051 |
| 2011/0222485 A1* | 9/2011 | Nangia | ................. H04L 1/1896 |
| | | | 370/329 |

(Continued)

FOREIGN PATENT DOCUMENTS

| CN | 101631374 A | 1/2010 |
| CN | 101801097 A | 8/2010 |

(Continued)

OTHER PUBLICATIONS

Samsung,"Codeword-to-layer mapping for DL and UL NR MIMO",3GPP TSG RAN WG1 NR Ad-Hoc R1-1701201, Spokane, USA, Jan. 16-20, 2017,total 7 pages.

(Continued)

*Primary Examiner* — Albert Decady
*Assistant Examiner* — Osman M Alshack
(74) *Attorney, Agent, or Firm* — Womble Bond Dickinson (US) LLP

(57) ABSTRACT

In accordance with an embodiment, the application discloses a communication method that includes the operations: generating downlink control information DCI; and sending the DCI to a terminal device. The DCI includes indication information used to indicate a single codeword scheduled by using the DCI, or a correspondence between a single codeword scheduled by using the DCI and a first resource. Alternatively, the DCI includes a first number of a hybrid automatic repeat request HARQ process corresponding to a single codeword scheduled by using the DCI, where a quantity of values of the first number is greater than a quantity of values of a second number of an HARQ process used by either one codeword of DCI used to schedule two codewords. In embodiments of the application, a utilization rate of an HARQ buffer can be improved.

15 Claims, 5 Drawing Sheets

(51) Int. Cl.
*H04L 1/06* (2006.01)
*H04L 5/00* (2006.01)
*H04W 72/04* (2009.01)

(52) U.S. Cl.
CPC .......... *H04L 1/1896* (2013.01); *H04L 5/0055* (2013.01); *H04W 72/042* (2013.01); *H04L 1/0003* (2013.01)

(58) Field of Classification Search
CPC ... H04L 1/0003; H04L 1/1822; H04L 1/1812; H04L 1/1835; H04L 1/1864; H04W 72/042; H04W 72/1263; H04W 72/14
USPC .................................................. 714/748–750
See application file for complete search history.

(56) References Cited

U.S. PATENT DOCUMENTS

| | | | |
|---|---|---|---|
| 2011/0317643 A1 | 12/2011 | Gaal et al. | |
| 2012/0307775 A1* | 12/2012 | Chung .................. | H04L 1/1671 370/329 |
| 2012/0320863 A1* | 12/2012 | Lee ...................... | H04L 1/0003 370/329 |
| 2013/0107835 A1* | 5/2013 | Aiba .................. | H04W 72/0406 370/329 |
| 2013/0107855 A1* | 5/2013 | Takeda .............. | H04W 72/0446 370/330 |
| 2015/0156753 A1 | 6/2015 | Shan et al. | |
| 2015/0181576 A1* | 6/2015 | Papasakellariou .... | H04L 5/0053 370/329 |
| 2015/0319750 A1 | 11/2015 | Ko et al. | |
| 2016/0037524 A1* | 2/2016 | Krzymien ............. | H04L 1/1896 370/329 |
| 2016/0234820 A1* | 8/2016 | Mallik .................. | H04L 1/1896 |
| 2017/0223673 A1 | 8/2017 | Dinan et al. | |
| 2017/0289995 A1* | 10/2017 | Lin .................. | H04W 72/0446 |
| 2018/0152925 A1* | 5/2018 | Nammi ............... | H04W 72/082 |
| 2019/0253204 A1* | 8/2019 | Takeda .................. | H04W 28/04 |

FOREIGN PATENT DOCUMENTS

| | | |
|---|---|---|
| CN | 102137504 A | 7/2011 |
| CN | 106537979 A | 3/2017 |
| WO | 2016015648 A1 | 2/2016 |

OTHER PUBLICATIONS

Samsung,"DCI Formats and Contents for NR",3GPP TSG RAN WG1 Meeting #88bis R1-1705411,Spokane, USA, Apr. 3-7, 2017,total 6 pages.

Intel Corporation,"DCI design considerations for NR",3GPP TSG-RAN WG1 #89 R1-1707384,Hangzhou, P R. China, May 15-19, 2017,total 6 pages.

Samsung,"The number of TBs per UL HARQ process",3GPP TSG-RAN WG2 Meeting#98 R2-1704479,Hangzhou, China, May 15-19, 2017,total 2 pages.

* cited by examiner

COMMUNICATION METHOD AND APPARATUS

CROSS-REFERENCE TO RELATED APPLICATIONS

This application is a continuation of International Application No. PCT/CN2018/099705, filed on Aug. 9, 2018, which claims priority to Chinese Patent Application No. 201710687955.2, filed on Aug. 11, 2017. The disclosures of the aforementioned applications are herein incorporated by reference in their entireties.

TECHNICAL FIELD

This application relates to the communications field, and more specifically, to a communication method and apparatus in the communications field.

BACKGROUND

A 5G new radio (NR) system supports downlink control information (downlink control information, DCI) corresponding to a physical downlink data channel PDSCH to include only scheduling information of one codeword. In embodiments of this application, the DCI is referred to as single-codeword DCI. In the 5G NR system, for downlink coordinated multiple points (CoMP), if the terminal device is configured no more than 4 receive antennas, a maximum of 4 data streams may be transmitted. Therefore, a maximum quantity of transport codewords is 1. In addition, for edge user equipment, even if the terminal device has more than 4 receive antennas, no more than 4 data streams may be simultaneously transmitted by the terminal device due to higher channel correlation and degraded channel quality, so that corresponding downlink data scheduling may be performed correspondingly by using the single-codeword DCI.

In this case, the NR system uses only one codeword (that is, a CW0 or a CW1) by default. Correspondingly, only an HARQ buffer corresponding to the single codeword is used. However, UE is capable of sending or receiving two codewords. Correspondingly, the UE supports HARQ buffers of two codewords. How to make full use of an HARQ buffer capability of the UE is an urgent problem to be resolved.

SUMMARY

This application provides a communication method and apparatus, capable of improving a utilization rate of an HARQ buffer.

According to a first aspect, a communication method is provided, including:

generating downlink control information DCI, where the DCI includes indication information used to indicate a single codeword scheduled by using the DCI, or a correspondence between a single codeword scheduled by using the DCI and a first resource; or the DCI includes a first number of a hybrid automatic repeat request HARQ process corresponding to a single codeword scheduled by using the DCI, where a quantity of values of the first number is greater than a quantity of values of a second number of an HARQ process used by either one codeword of DCI used to schedule two codewords; and sending the DCI to a terminal device.

The either one codeword may be each codeword or one of the codewords.

When the either one codeword is each codeword, the utilization rate of the HARQ buffer may be further improved.

According to a second aspect, a communication method is provided, including:

receiving downlink control information DCI from a network device, where the DCI includes indication information used to indicate a single codeword scheduled by using the DCI, or a correspondence between a single codeword scheduled by using the DCI and a first resource; or the DCI includes a first number of a hybrid automatic repeat request HARQ process corresponding to a single codeword scheduled by using the DCI, where a quantity of values of the first number is greater than a quantity of values of a second number of an HARQ process used by either one codeword of DCI used to schedule two codewords; and receiving downlink data or sending uplink data based on the DCI.

In this way, the network device may send, to the terminal device, first DCI that includes information used to indicate scheduling the CW0 and second DCI that includes information used to indicate scheduling the CW1, or may further send third DCI that includes information used to indicate scheduling another codeword, so that two or more codewords may be scheduled between the terminal device and the network device by sending the single-codeword DCI.

In one embodiment, the DCI further includes at least one of modulation and coding scheme information, new data indicator information, redundancy version information, precoding and transport layer indication information, transport block group CBG indication information, rank indication RI information, or resource allocation information that corresponds to the single codeword.

Therefore, in this embodiment of this application, the downlink data scheduling and the uplink data scheduling may be performed by using the single-codeword DCI, thereby reducing overheads of the DCI. Especially for the edge user equipment, under a premise in which a control channel uses a same physical time-frequency resource overhead, transmission reliability of the DCI may be improved.

In one embodiment, the indication information is joint coding information, and the joint coding information is further used to indicate at least one piece of other information than the indication information in the DCI, where the at least one piece of other information is at least one of the following information: modulation and coding scheme information, new data indicator information, redundancy version information, precoding and transport layer indication information, code block group CBG indication information, rank indication RI information, or resource allocation information.

In this way, bit overheads of the DCI may be reduced in a joint coding manner.

In one embodiment, the first resource is a downlink control channel PDCCH resource configured to transmit the DCI.

In one embodiment, the first resource is a scrambling resource used to scramble the PDCCH that transmits the single-codeword DCI.

In one embodiment, the first resource is related to the downlink control channel PDCCH configured to transmit the DCI.

Herein, the scrambling resource is used to scramble a control channel. For example, the scrambling resource may be a cell radio network temporary identifier (C-RNTI). The C-RNTI may be used to scramble a cyclic redundancy check (CRC) of the control channel or a data channel. In this embodiment of this application, the C-RNTI is used to scramble the CRC of the control channel.

Therefore, the codeword scheduled by using the DCI may be implicitly indicated based on the correspondence between the first resource and the single codeword scheduled by using the DCI. In this way, bit overheads of the DCI and signaling overheads may be reduced.

In one embodiment, a value range of the second number is a proper subset of a value range of the first number.

In one embodiment, the quantity of the HARQ processes used by the single codeword scheduled by using the single-codeword DCI is equal to a sum of quantities of HARQ processes used by all codewords of the dual-codeword DCI. In one embodiment, the HARQ processes of two codewords in the dual-codeword DCI are renumbered, to form the HARQ process corresponding to the single-codeword DCI.

In one embodiment, the network device sends the downlink data to the terminal device based on the DCI.

In one embodiment, the terminal device sends an ACK or a NACK that corresponds to data corresponding to the single codeword scheduled by using the DCI to the network device.

One HARQ process may process only one transport block (TB) at a same transmission time interval (TTI). The TTI is a time unit of a single scheduling transmission duration, and may be a slot, a mini-slot, a subframe, a symbol, a plurality of symbols, a plurality of aggregated slots, or the like. This is not limited in this application.

In one embodiment, the terminal device sends the uplink data to the network device based on the DCI.

In one embodiment, the network device sends an ACK or a NACK that corresponds to data corresponding to the single codeword scheduled by using the DCI to the terminal device.

Therefore, in this embodiment of this application, when the uplink data or the downlink data is scheduled by using the DCI, information of the single codeword scheduled by using the DCI is indirectly or directly indicated, so that the terminal may perform data transmission by using different codewords, or the quantity of HARQ processes of the data corresponding to the single codeword may be increased in this embodiment of this application. Therefore, in this embodiment of this application, a utilization rate of an HARQ resource may be improved in an IP-RAN scenario in which backhaul latency is relatively large, and the problem of HARQ suspension during joint reception or joint transmission is resolved.

In addition, because the terminal device itself is capable of receiving two codewords and correspondingly has an HARQ buffer of two codewords, complexity of the terminal device is not increased in this embodiment of this application.

This application is described by using the codeword as an example. It may be understood that due to the correspondence between the codeword and the transport block, the solution in this application is alternatively feasible when this application is described by using the transport block instead of the codeword.

According to a third aspect, a network device is provided. The network device provided by this application has a function of implementing behavior of the network device in the foregoing method aspect, and includes a corresponding means configured to perform the operations or functions described in the foregoing method aspect. The operations or functions may be implemented in software, or hardware, or a combination of hardware and software.

In one embodiment, the network device described above includes one or more processors and a transceiver unit. The one or more processors are configured to support the network device in performing a corresponding function in the foregoing method, for example, generating DCI. The transceiver unit is configured to support the network device in communicating with another device, and implement a receiving/sending function, for example, sending the DCI generated by the processor.

In this application, "/" may represent "and/or".

In one embodiment, the network device may further include one or more memories. The memory is configured to be coupled to the processor, and store a necessary program instruction and necessary data for the network device. The one or more memories may be integrated with the processor, or disposed separately from the processor. This is not limited in this application.

The network device may be a base station, a TRP, or the like. The transceiver unit may be a transceiver, or a transceiver circuit.

The network device may alternatively be a communications chip. The transceiver unit may be an input/output circuit or an interface of the communications chip.

In one embodiment, the network device described above includes a transceiver, a processor and a memory. The processor is configured to control the transceiver to send and receive a signal. The memory is configured to store a computer program. The processor is configured to invoke and run the computer program from the memory, enabling the network device to perform the method performed by the network device according to the first aspect, the second aspect, any one of the possible implementations of the first aspect, or any one of the possible implementations of the second aspect.

According to a fourth aspect, a terminal device is provided. The terminal device provided by this application has a function of implementing behavior of the terminal device in the foregoing method aspect, and includes a corresponding means configured to perform the operations or functions described in the foregoing method aspect. The operations or functions may be implemented in software, or hardware, or a combination of hardware and software.

In one embodiment, the terminal device described above includes one or more processors and a transceiver unit. The transceiver unit is configured to support the terminal device in communicating with another device, and implement a receiving/sending function, for example, receiving DCI, and/or receiving downlink data, and/or sending uplink data. The one or more processors are configured to support the terminal device in performing the corresponding function in the foregoing method, for example, parsing DCI.

In one embodiment, the terminal device may further include one or more memories. The memory is configured to be coupled to the processor, and store a necessary program instruction and necessary data for a base station. The one or more memories may be integrated with the processor, or disposed separately from the processor. This is not limited in this application.

The terminal device may be UE, and the like. The transceiver unit may be a transceiver, or a transceiver circuit.

The terminal device may alternatively be a communications chip. The transceiver unit may be an input/output circuit or an interface of the communications chip.

In one embodiment, the terminal device described above includes a transceiver, a processor and a memory. The processor is configured to control the transceiver to send and receive a signal. The memory is configured to store a computer program. The processor is configured to invoke and run the computer program from the memory, enabling the terminal device to perform the method performed by the terminal device according to the first aspect, the second aspect, any one of the possible implementations of the first aspect, or any one of the possible implementations of the second aspect.

According to a fifth aspect, a system is provided. The system includes the terminal device and the network device described above.

According to a sixth aspect, a computer program product is provided. The computer program product includes a computer program (also referred to as code or an instruction). When the computer program is run, a computer is enabled to perform the method according to the first aspect, the second aspect, any one of the possible implementations of the first aspect, or any one of the possible implementations of the second aspect described above.

According to a seventh aspect, a computer-readable medium is provided. The computer-readable medium stores a computer program (also referred to as code or an instruction). When the computer program is run on a computer, the computer is enabled to perform the method according to the first aspect, the second aspect, any one of the possible implementations of the first aspect, or any one of the possible implementations of the second aspect described above.

DESCRIPTION OF EMBODIMENTS

Figure 1:
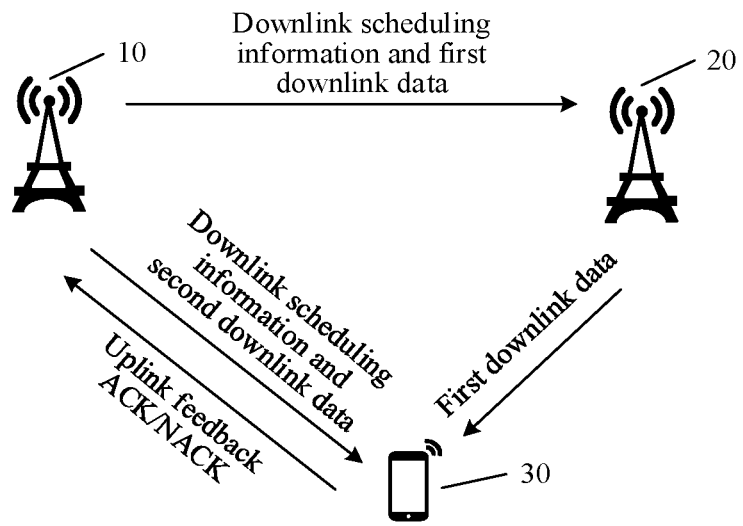
FIG. 1 is a schematic diagram of downlink CoMP transmission according to an embodiment of this application.

The following describes the technical solutions in this application with reference to the accompanying drawings.

A technical solution of embodiments of this application may be applied to various communications systems, such as a long term evolution (LTE) system, an LTE frequency division duplex (FDD) system, an LTE time division duplex (TDD) system, a 5th generation (5G) system, a new radio (NR) system, and various evolved or converged systems, or such as a transmission point (TRP or TP) in the NR system, a gNB in the NR system, an antenna panel or a group (including a plurality of antenna panels) of antenna panels of a base station in the 5G system. This is not particularly limited in the embodiments of this application.

In the embodiments of this application, a terminal device is a device having a wireless sending and receiving function, and includes but is not limited to user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone set, a session initiation protocol (SIP) phone, a wireless local loop (WLL) station, a personal digital assistant (PDA), a handheld device having a wireless communications function, a computing device, another processing device connected to a wireless modem, an in-vehicle device, a wearable device, a drone device, smart household, a terminal device in a 5G network, a terminal device in a future evolved public land mobile network (PLMN), or the like. This is not limited in the embodiments of this application.

In the embodiments of this application, a network device may be a device configured to communicate with the terminal device. The network device may be an evolved NodeB (eNB or eNodeB) in the LTE system, or a wireless controller in a cloud radio access network (CRAN) scenario. Alternatively, the network device may be a relay station, an access point, an in-vehicle device, a wearable device, a drone system, smart household, Internet of Things, a network device in the 5G network, a network device in the future evolved PLMN network, or the like. This is not limited in the embodiments of this application.

In a coordinated multiple points (CoMP) transmission scenario, data is sent or received jointly by a plurality of network side devices/base stations, so that system capacity and reliability of data transmission may be improved. In an actual scenario, data transmission between different network side devices/base stations is performed through a backhaul/fronthaul link. When the backhaul/fronthaul link has latency or a bandwidth limitation, an ideal information exchange between the base stations may not be achieved. For example, an X2 interface is a data packet transmission protocol carried on an IP protocol, and different network side devices/base stations have non-ideal latency when connected through the X2 interface. A non-ideal backhaul/fronthaul the scenario is alternatively referred to as a distributed RAN (D-RAN) scenario or an Internet Protocol (IP-RAN) scenario.

FIG. 1 is a schematic diagram of downlink CoMP transmission according to an embodiment of this application. As shown in FIG. 1, a first network device 10 may be a service transmission reception point (TRP), or may be referred to as a service network device. A second network device 20 may be a coordinated TRP, or may be referred to as a coordinated network device. The first network device may alternatively be the same as the second network device, that is, both the first network device and the second network device are service TRPs or coordinated TRPs. In addition, the first network device 10 and the second network device 20 are network devices in an IP-RAN scenario. In other words, in the embodiments of this application, the first network device 10 and the second network device 20 are connected through a predefined interface, such as an X2 interface, and a backhaul/fronthaul link is non-ideal.

In FIG. 1, the first network device 10 and the second network device 20 jointly send downlink data to a terminal device 30.

Specifically, the first network device 10 generates downlink scheduling information, and transfers the downlink scheduling information to the second network device 20, for example, sends the downlink scheduling information to the second network device through the X2 interface. In one embodiment, herein, the first network device 10 may alternatively send first downlink data to the terminal device 30. Then, the first network device 10 sends the downlink scheduling information and second downlink data to the terminal device 30 at first time, and the second network device 20 sends, based on the downlink scheduling information, the first downlink data to the terminal device 30 at second time. When receiving the first downlink data and/or the second downlink data, and determining that the received downlink data has no error, the terminal device 30 may send an acknowledgement (ACK) feedback to the first network device 10 and/or the second network device 20. Alternatively, when determining that no first downlink data or second downlink data is received, or the received downlink data has an error, the terminal device 30 may send a negative acknowledgement NACK feedback to the first network device 10 and/or the second network device 20. The first time and/or the second time is greater than or equal to backhaul/fronthaul latency.

The first time and/or the second time may be determined based on the backhaul/fronthaul latency. For example, the backhaul/fronthaul latency between the first network device 10 and the second network device 20 is used as the first time and/or the second time. Alternatively, the first time and/or the second time is determined by negotiation between the network devices. This is not limited in the embodiments of this application. The first downlink data and the second downlink data may be a same data stream or different data streams.

In one embodiment, an antenna port that sends the first downlink data and an antenna port that sends the second downlink data may be a same antenna port, or different antenna ports.

In one embodiment, a beam that sends the first downlink data and a beam that sends the second downlink data may be a same beam, or different beams. In one embodiment, when the first downlink data is different from the second downlink data, the first downlink data and the second downlink data is sent by using different antenna ports, or the first downlink data and the second downlink data is sent by using a same antenna port and different beams.

Herein, the beam may be understood as a spatial resource, and may be a sending or receiving precoding vector having energy transmission directivity. The energy transmission directivity may mean that, in a spatial location, a signal received after precoding processed by the precoding vector has relatively good receive power, such as satisfying a receiving demodulation signal-to-noise ratio. The energy transmission directivity may alternatively mean that a same signal that is sent from different spatial locations and that is received by the precoding vector has different receive power. A same device (for example, a network device or a terminal device) may have different precoding vectors, or different devices may have different precoding vectors, that is, correspond to different beams. For a configuration or a capability of the device, one device may use one or more of a plurality of different precoding vectors at a same time, that is, one or more beams may be simultaneously formed. Beam information may be identified in a plurality of manners.

In one beam identification manner, identification is performed by using index information. The index information may correspond to a resource or identity (ID) that configures the terminal device, for example, corresponds to an ID or a resource of a configured channel state information-reference signal (CSI-RS), or may correspond to an ID or a resource of a configured uplink sounding reference signal (SRS). Alternatively, the index information may be index information that is explicitly or implicitly carried by a signal or channel carried by the beam, and includes but is not limited to index information that indicates the beam by sending a synchronization signal, a broadcast channel, or an uplink random access channel through the beam.

In another beam identification manner, the beam is identified by configuring a configured resource and a signal or channel sent through the beam to satisfy a spatial quasi co-location QCL property. The spatial quasi co-location QCL property means that the channels have a same spatial domain parameter or similar spatial domain parameters. For example, the spatial domain parameter may be one of an angle of arrival (AOA), a dominant AoA, an average AoA, an angle of departure (AOD), a channel correlation matrix, a power angular spread spectrum of the angle of arrival, an average AoD, a power angular spread spectrum of the angle of departure, a transmit channel correlation, a receive channel correlation, transmit beamforming, receive beamforming, a spatial channel correlation, a spatial filter, a spatial filter parameter, a spatial receiving parameter, or the like. The configured resource may be one or more of a CSI-RS, an SRS, a synchronization signal, a broadcast channel, and the like. Certainly, there may be another beam identification manner, and the manner in which the beam performs identification and indication is not limited in this application.

In one embodiment, when the first downlink data is the same as the second downlink data, the first downlink data and the second downlink data is sent by using a same antenna port, or is sent by using different antenna ports. In this case, the first downlink data and the second downlink data may be sent by using a same beam or different beams.

Figure 2:
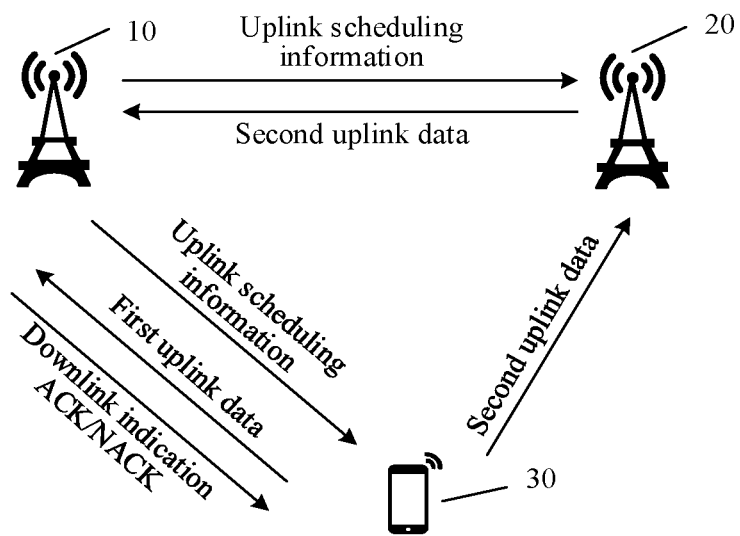
FIG. 2 is a schematic diagram of uplink CoMP transmission according to an embodiment of this application.

FIG. 2 is a schematic diagram of uplink CoMP transmission according to an embodiment of this application. A same mark in FIG. 2 and FIG. 1 indicates a same or similar meaning. In FIG. 2, a first network device 10 and a second network device 20 jointly receive uplink data sent by a terminal device 30.

Specifically, the first network device 10 generates uplink scheduling information, and sends the uplink scheduling information to second network device 20 and the terminal device 30. The first network device 10 may transfer the uplink scheduling information to the second network device 20 through a predefined interface, such as an X2 interface. Then, the terminal device 30 may send, based on the uplink scheduling information, first uplink data to the first network device 10 and second uplink data to the second network device 20 at third time. After receiving the second uplink data, the second network device 20 sends the second uplink data to the first network device 10 through a predefined interface, such as an X2 interface. When receiving the first uplink data and the second uplink data, and determining that the received uplink data has no error, the first network device 10 may send an acknowledgement ACK feedback to the terminal device 30. Alternatively, when determining that no first uplink data or second uplink data is received, or the received uplink data has an error, the first network device 10 may send a NACK feedback to the terminal device 30. The third time is greater than or equal to backhaul/fronthaul latency.

The third time may be determined based on the backhaul/fronthaul latency. For example, the backhaul/fronthaul latency between the first network device 10 and the second network device 20 is used as the third time. Alternatively, the third time is determined by negotiation between the network devices. This is not limited in the embodiments of this application. The first uplink data and the second uplink data may be a same data stream or different data streams.

In one embodiment, an antenna port that sends the first uplink data and an antenna port that sends the second uplink data may be a same antenna port, or different antenna ports.

In one embodiment, a beam that sends the first uplink data and a beam that sends the second uplink data may be a same beam, or different beams. In one embodiment, when the first uplink data is different from the second uplink data, the first uplink data and the second uplink data is sent by using different antenna ports, or the first uplink data and the second uplink data is sent by using a same antenna port and different beams. In one embodiment, when the first uplink data is the same as the second uplink data, the first uplink data and the second uplink data may be sent by using a same antenna port, or may be sent by using different antenna ports. In this case, the first uplink data and the second uplink data may be sent by using a same beam or different beams.

In one embodiment, when the first uplink data is the same as the second uplink data and the first uplink data and the second uplink data is sent by using a same antenna port, the terminal device may send only once, and the first network device 10 and the second network device 20 may respectively receive uplink data from the terminal device, that is, UE sends only one type of data, and the first network device and the second network device simultaneously receive the data.

In one embodiment, when the first uplink data and the second uplink data are sent by using different antenna ports and/or different beams, the first network device and the second network device may independently send uplink scheduling information that corresponds to first data and second data, that is, the terminal device may receive uplink scheduling information that schedules the first uplink data and uplink scheduling information that schedules the second uplink data.

In an embodiment of this application, the downlink scheduling information may alternatively be a downlink scheduling grant (DL grant). The downlink scheduling information or the DL grant is used to schedule a downlink data channel, and the downlink data channel may be a physical downlink shared channel PDSCH. The uplink scheduling information may alternatively be an uplink scheduling grant (UL grant). The uplink scheduling information or the UL grant is used to schedule uplink data, and the uplink data may be sent through an uplink data channel, such as a physical uplink shared channel (PUSCH). In this embodiment of this application, the uplink scheduling information or the downlink scheduling information may be collectively referred to as scheduling information, and the scheduling information generally corresponds to downlink control information DCI. For ease of description, the DCI is collectively used as an example in the following description, the DCI in this application may alternatively be replaced with the scheduling information, and for the DL grant (for a case of downlink scheduling), or the UL grant (for a case of uplink scheduling), a solution described in this application is still applicable.

In an embodiment of this application, a codeword is a symbol sequence obtained by a transport block (TB) after at least one step of adding cyclic redundancy check bits, encoding, scrambling, modulating, and the like is performed. In one embodiment, one transport block corresponds to one codeword. The codeword and the transport block may be considered as different names of same information data at different stages in an information processing procedure. In this application, codeword indication information may alternatively be referred to as transport block indication information, and the codeword indication information has a same meaning as the transport block indication information unless particularly specified.

Figure 3:
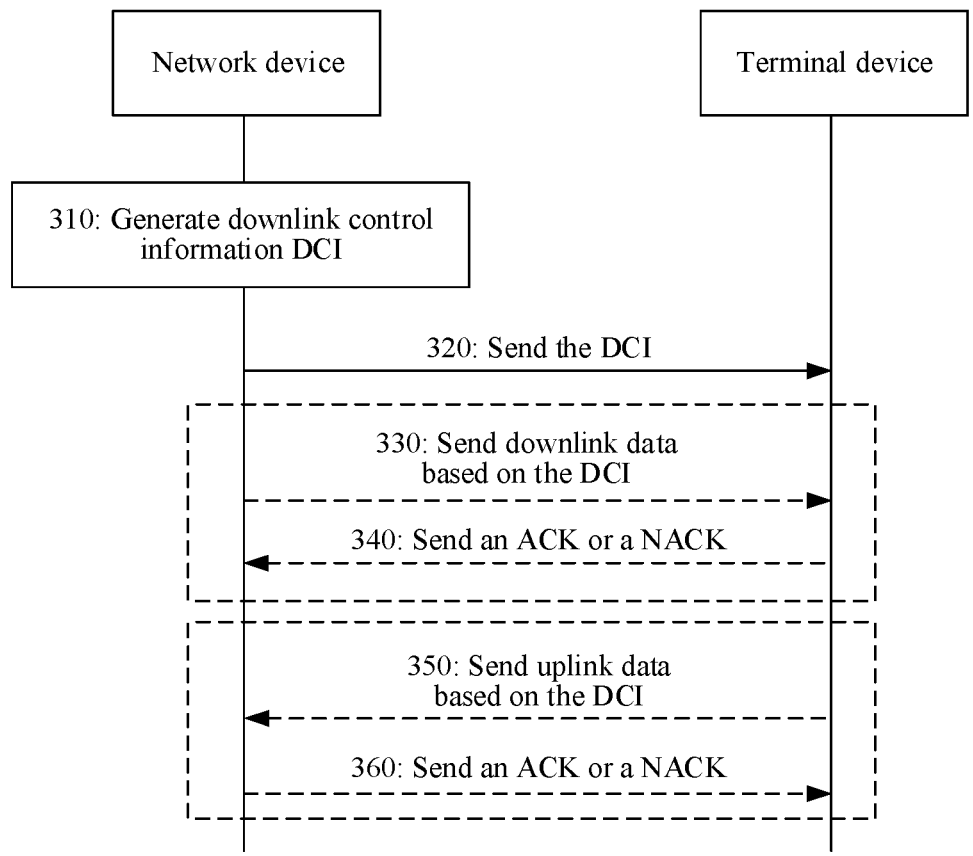
FIG. 3 is a schematic interaction diagram of a communication method according to an embodiment of this application.

FIG. 3 is a schematic interaction diagram of a communication method according to an embodiment of this application. A network device in FIG. 3 may be the first network device 10 in FIG. 1 or FIG. 2 described above, and a terminal device may be the terminal device 30 in FIG. 1 or FIG. 2.

310: A network device generates downlink control information DCI.

Herein, the DCI is the scheduling information described above. The DCI may be uplink scheduling information, or may be downlink scheduling information. Specifically, the DCI may be used to schedule uplink data during joint reception (JR), or the DCI may be used to schedule downlink data during joint transmission (JT).

In an embodiment of this application, the DCI is used to schedule a single codeword, that is, a single transport block. Therefore, in the embodiment of this application, the DCI may alternatively be referred to as single-codeword DCI or single transport block DCI. In one embodiment, the single-codeword DCI may be used to schedule more than one multiple input multiple output (MIMO) layer, for example, may be used to schedule a maximum of four MIMO transport layers. The MIMO transport layer may alternatively correspond to data streams simultaneously scheduled or transmitted. In this embodiment of this application, there may be a case in which the MIMO transport layer is jointly used with a transport layer, and the MIMO transport layer has a same meaning as the transport layer unless particularly specified.

In a 5G NR system, for downlink CoMP (for example, JT), it is considered that the single-codeword DCI may be used to perform corresponding downlink data scheduling. In the NR system, when the number of the transport layers is less than or equal to 4, only one codeword is transmitted, that is, one codeword may be mapped to a maximum of four layers.

However, for uplink CoMP (for example, JR), a quantity of uplink antennas is usually 1 or 2. For a terminal having a high capability, such as an in-vehicle terminal, a relay, and a CPE, the quantity of the uplink antennas may be 4. Therefore, the number of uplink transport layers usually does not exceed 4, and a quantity of corresponding transport codewords may be 1. In addition, for edge user equipment, even if the terminal device has more than 4 sending antennas, no more than 4 data streams may be simultaneously transmitted by the terminal device due to higher channel correlation and degraded channel quality, so that corresponding uplink data scheduling may be performed correspondingly by using the single-codeword DCI.

Therefore, in this embodiment of this application, the downlink data scheduling and the uplink data scheduling may be performed by using the single-codeword DCI, thereby reducing overheads of the DCI. Especially for the edge user equipment, under a premise in which a control channel uses a same physical time-frequency resource overhead, transmission reliability of the DCI may be improved.

For example, DCI may include one or more of a resource allocation (RA) field used to indicate a scheduled physical time-frequency resource, a modulation and coding scheme (MCS) field used to indicate a modulation order and code rate information or a modulation and coding rank, a new data indicator (NDI) field used to indicate whether data currently scheduled is newly scheduled or retransmitted, and a redundancy version (RV) field used to indicate HARQ version information corresponding to the data currently scheduled, where the fields are of the single codeword (or transport block) scheduled by using the DCI, or may include a new field jointly encoded by at least two of the plurality of fields described above. For example, the MCS field and the RV field may be jointly encoded to form a modulation and coding scheme and redundancy version (modulation and coding scheme and redundancy version) field. It should be understood that a function of the new field may implement all or some of functions of a plurality of independent fields combined together.

In a possible implementation, the DCI includes indication information used to indicate a single codeword (or transport block) scheduled by using the DCI. Using two codewords, namely, a codeword 0 and a codeword 1 as an example, the indication information may indicate whether a codeword scheduled by using current DCI is the codeword 0 (CW0) or the codeword 1 (CW1), or indicate a transport block 1 or a transport block 2. For example, when the single codeword scheduled by using the DCI is the CW0, the DCI may include an MCS/RV/NDI field of the transport block 1, or when the single codeword scheduled by using the DCI is the CW1, the DCI may include an MCS/RV/NDI field of the transport block 2.

In this way, the network device may send, to the terminal device, first DCI that includes information used to indicate scheduling the CW0 and second DCI that includes information used to indicate scheduling the CW1, or may further send third DCI that includes information used to indicate scheduling another codeword, so that two or more codewords may be scheduled between the terminal device and the network device by sending the single-codeword DCI.

In one embodiment, the indication information may be one field included in the DCI (referred to as a codeword indication field or a transport block indication field in this application), for example, 1 bit. The codeword indication field may independently indicate information of a codeword currently scheduled, or information of a transport block.

In one embodiment, the indication information is joint coding information, and the joint coding information is further used to indicate at least one piece of other information than the indication information in the DCI, where the at least one piece of other information is at least one of the following information: modulation and coding scheme information, new data indicator information, redundancy version information, precoding and transport layer indication information, code block group CBG indication information, rank indication RI information, or resource allocation information.

For example, the joint coding information may further be used to indicate transmission precoding information and information about the number of transport layers, in addition to the indication information. The joint coding information may have N bits, and may correspondingly indicate 2^N states, where N is a positive integer greater than 1.

2^(N−1) states in the 2^N states may indicate that a scheduled codeword is the codeword 0 and indicate information about the number of transport layers (where the range may be from 1 to 4) corresponding to the codeword 0 and transmission precoding information that is used, and the remaining 2^(N−1) states in the 2^N states may indicate that a scheduled codeword is the codeword 1 and indicate information about the number of transport layers (where the range may be from 1 to 4) corresponding to the codeword 1 and transmission precoding information that is used.

In the 2^N states, the 2^(N−1) states corresponding to information that indicates the codeword 0 and the 2^(N−1) states corresponding to information that indicates the codeword 1 may be determined in a protocol specified manner, a locally pre-stored manner, or a pre-defined manner, or may be configured by a network side device. For example, in the protocol specified manner, the locally pre-stored manner, or the pre-defined manner, if the first bit is 0, all corresponding states are information of the codeword 0, or if the first bit is 1, all corresponding states are information of the codeword 1. The configuration may be performed by using a radio resource control (RRC) message, a media access control element (MAC CE) message, or another message. This is not limited in this application.

In one embodiment, the joint coding information described above may alternatively be interpreted as whether a precoding and transport layer indication field is multiplexed. That is, the joint coding information described above is used to indicate at least one of two codewords. When not multiplexed, the field indicates a maximum rank of 4. The field may have M bits and correspondingly indicate 2^M states, where M is a positive integer. M and N may have a same value or different values. Whether a meaning of the field is to indicate that a rank of a single fixed codeword (for example, the codeword 0) ranges from 1 to 4, or to indicate, by jointly encoding, a codeword identifier (for example, the codeword 0 or the codeword 1) currently scheduled and a rank and transmission precoding corresponding to the codeword may be determined in a protocol specified manner, a locally pre-stored manner, or a pre-defined manner, or may be configured by a network side device. The configuration may be performed by using an RRC message, a media access control element MAC CE message, or another message. This is not limited in this application.

In one embodiment, the field determined in the protocol specified manner, the locally pre-stored manner, or the pre-defined manner may have the following meanings. For single carrier transmission, or there are only 1 or 2 sending antenna ports, the field means a codeword identifier (for example, the codeword 0 or the codeword 1) currently scheduled and a rank and transmission precoding corresponding to the codeword. For multi-carrier transmission, or there are more than 2 antenna ports, the meaning of the field is to currently schedule a rank and transmission precoding information of a single fixed codeword, and indicate that the rank ranges from 1 to 4.

In one embodiment, when the precoding and transport layer indication field means a codeword identifier (for example, the codeword 0 or the codeword 1) currently scheduled and a rank and transmission precoding corresponding to the codeword, 2^N states of the field correspond to different codewords and ranks and precoding information corresponding to the codewords. In the 2^N states, the 2^(N−1) states corresponding to information that indicates the codeword 0, and the 2^(N−1) states corresponding to information that indicates the codeword 1 may be determined in a protocol specified manner, a locally pre-stored manner, or a pre-defined manner, or may be configured by a network side device. For example, in the protocol specified manner, the locally pre-stored manner, or the pre-defined manner, if the first bit of the field is 0, all corresponding states are information of the codeword 0, or if the first bit of the field is 1, all corresponding states are information of the codeword 1. The configuration may be performed by using an RRC message, a media access control element MAC CE message, or another message. This is not limited in this application.

For another example, the codeword indication information described above may alternatively be multiplexed with a code block group (CBG) indication field, that is, the joint coding information may indicate not only a codeword, but also a CBG initially transmitted or retransmitted. The CBG indication field may be 4 bits. For cooperative transmission, a bit in the field is determined as a codeword CW identifier by a configuration or in a protocol specified manner, a locally pre-stored manner, or a pre-defined manner. In this case, a CBG indication field after joint coding is a field obtained by joint coding by the indication information and the CBG indication field.

Specifically, $2^{\wedge}(3)=8$ states in $2^{\wedge}4=16$ states may indicate CBG information of which a scheduled codeword is the codeword 0, and the remaining $2^{\wedge}(3)=8$ states in the $2^{\wedge}4=16$ states may indicate CBG information of which a scheduled codeword is the codeword 1.

In the 16 states, the 8 states corresponding to information that indicates the codeword 0 and the 8 states corresponding to information that indicates the codeword 1 may be determined in a protocol specified manner, a locally pre-stored manner, or a pre-defined manner, or may be configured by a network side device. For example, in the protocol specified manner, the locally pre-stored manner, or the pre-defined manner, if the first bit is 0, all corresponding states are information of the codeword 0, or if the first bit is 1, all corresponding states are information of the codeword 1. The configuration message may be an RRC message, a MAC CE message, or another message. This is not limited in this application.

For another example, the codeword indication information described above may alternatively be multiplexed with a rank indicator (RI) field, that is, the joint coding information may indicate not only a codeword, but also a rank. The RI field may be 3 bits, and in this case eight states may be indicated. The eight states are protocol-specified, locally pre-stored, pre-defined, or configured. Four states may indicate that the number of CW0+ transport layers is 1 to 4, and the other four states indicate that the number of CW1+ transport layers is 1 to 4.

Specifically, 4 states in the 8 states may indicate that a scheduled codeword is the codeword 0 and indicate information about the number of transport layers (1 to 4 layers) corresponding to the codeword 0, and the remaining 4 states in the 8 states may indicate that a scheduled codeword is the codeword 1 and indicate information about the number of transport layers (1 to 4 layers) corresponding to the codeword 1.

In the 8 states, the 4 states corresponding to information that indicates the codeword 0 and the 4 states corresponding to information that indicates the codeword 1 may be determined in a protocol specified manner, a locally pre-stored manner, or a pre-defined manner, or may be configured by a network side device. For example, in the protocol specified manner, the locally pre-stored manner, or the pre-defined manner, if the first bit of the field is 0, all corresponding states are information of the codeword 0, or if the first bit of the field is 1, all corresponding states are information of the codeword 1. The configuration message may be an RRC message, a MAC CE message, or another message. This is not limited in this application.

Alternatively, the RI field may be 2 bits, and whether a meaning of the field is to indicate that a rank of a single fixed codeword (for example, the codeword 0) ranges from 1 to 4, or to indicate, by jointly encoding, a codeword (for example, the codeword 0 or the codeword 1) currently scheduled and a rank corresponding to the codeword may be determined in a protocol specified manner, a locally pre-stored manner, or a pre-defined manner, or may be configured by a network side device. The configuration may be performed by using an RRC message, a media access control element MAC CE message, or another message. This is not limited in this application.

In one embodiment, the field determined in the protocol specified manner, the locally pre-stored manner, or the pre-defined manner may have the following meanings. For single carrier transmission, or there are only 1 or 2 sending antenna ports, the field means a codeword (for example, the codeword 0 or the codeword 1) currently scheduled and a rank corresponding to the codeword. For multi-carrier transmission, or there are more than 2 antenna ports, the meaning of the field is to currently schedule rank information of a single fixed codeword, and the rank information indicates that the rank ranges from 1 to 4.

In one embodiment, when the rank indicator field means a codeword (for example, the codeword 0 or the codeword 1) currently scheduled and a rank corresponding to the codeword, the field corresponds to 4 states, where 2 states correspond to the codeword 0 and a rank corresponding to the codeword 0, and the other 2 states correspond to the codeword 1 and a rank corresponding to the codeword 1. In the 4 states, the 2 states corresponding to information that indicates the codeword 0 and the 2 states corresponding to information that indicates the codeword 1 may be determined in a protocol specified manner, a locally pre-stored manner, or a pre-defined manner, or may be configured by a network side device. For example, in the protocol specified manner, the locally pre-stored manner, or the pre-defined manner, if the first bit of the field is 0, all corresponding states are information of the codeword 0, or if the first bit of the field is 1, all corresponding states are information of the codeword 1. The configuration may be performed by using an RRC message, a media access control element MAC CE message, or another message. This is not limited in this application.

The foregoing descriptions are merely examples. The at least one other information jointly encoded with the codeword indication information may be one or more of modulation and coding scheme information, new data indicator information, redundancy version information, or resource allocation information, or may be information indicated by any other indication field in the DCI indication field. This is not limited in this application. Correspondingly, for a joint coding manner, refer to the foregoing examples.

In one embodiment, there is a correspondence between a single codeword scheduled by using the DCI and a first resource, and the first resource is related to a downlink control channel PDCCH configured to transmit the DCI.

In another possible implementation, the first resource is a scrambling resource used to scramble the PDCCH that transmits the DCI. In other words, there is a correspondence between the scrambling resource used to scramble the PDCCH that transmits the DCI and the codeword scheduled by using the DCI.

Herein, the scrambling resource is used to scramble a control channel. For example, the scrambling resource may be a cell radio network temporary identifier (C-RNTI). The C-RNTI may be used to scramble a cyclic redundancy check (CRC) of the control channel or a data channel. In this embodiment of this application, the C-RNTI is used to scramble the CRC of the control channel.

The control channel scrambling resource may be another radio network temporary identifier, such as a semi-persistent scheduling cell radio network temporary identifier (SPS-CRNTI), a random access radio network temporary identifier (RA-RNTI), and a paging radio network temporary identifier (P-RNTI). This is not limited in this embodiment of this application.

In this embodiment of this application, the control channel scrambling resource may be protocol-specified, locally pre-stored, or pre-defined, or may be configured by a network device. For a control channel scrambling resource configured by the network device, the network device may send configuration information of the control channel scrambling resource to the terminal device. Specifically, the configuration information may be sent through the RRC message or the MAC CE message.

A correspondence between the control channel scrambling resource and the codeword may be protocol-specified, locally pre-stored, or pre-defined, or may be configured by a network device. For a correspondence that is between the control channel scrambling resource and the codeword and that is configured by the network device, the network device may send configuration information of the correspondence between the control channel scrambling resource and the codeword to the terminal device. The configuration information of the correspondence between the control channel scrambling resource and the codeword may be sent through the RRC message or the MAC CE message.

In one embodiment, the configuration information and the configuration information of the control channel scrambling resource may be different fields in a same message.

All of the correspondences described in this application may be embodied by one or more lists, formulas, strings of characters, arrays, or code, and the correspondences may be stored in a memory.

In a possible implementation, the first resource may be a downlink control channel PDCCH resource configured to transmit the DCI. In other words, there is a correspondence between the PDCCH resource that transmits the DCI and the codeword scheduled by using the DCI.

The network device may send resource configuration information of the downlink control channel to the terminal device, and the resource configuration information of the downlink control channel is used to configure a downlink control channel resource. The downlink control channel resource may include at least one of a time domain resource (for example, a start symbol of the control channel), a frequency domain resource (for example, a physical resource block occupied by the control channel), a bundle size of a resource element group (REG) (where all resource elements (RE) of the REG corresponding to the bundle size use same precoding, and one REG includes a plurality of REs), a quantity of aggregation levels of a search space (where the aggregation level is defined as a control channel element (CCE) that forms the control channel, and one CCE may include a plurality of REGs), a physical control channel candidate (where a CCE combination that the physical control channel may occupy includes a starting position of the occupied CCE and a quantity of the occupied CCE), a transmission type (a centralized or distributed mapping of the REG to the CCE), a frame structure parameter (one or more of a subcarrier spacing, a cyclic prefix length (also referred to as a CP type, such as a normal CP and an extended CP)), and a slot length that are used.

In one embodiment, the network device may send the resource configuration information of the downlink control channel through the RRC message.

A correspondence between the downlink control channel resource and the codeword may be protocol-specified, locally pre-stored, or pre-defined, or may be configured by a network device. For a correspondence that is between the control channel resource and the codeword and that is configured by the network device, the network device may send configuration information of the correspondence between the control channel resource and the codeword to the terminal device. The configuration information of the correspondence between the control channel resource and the codeword may be sent through the RRC message or the MAC CE message.

In one embodiment, the configuration information of the correspondence and the resource configuration information of the downlink control channel may be different fields in a same message.

In this embodiment of this application, DCI used to schedule two codewords may be referred to as dual-codeword DCI. The dual-codeword DCI includes information such as two MCS/RV/NDI fields. In other words, the dual-codeword DCI may enable an NR to support simultaneous scheduling and transmission of two codewords.

In another possible implementation, the DCI includes a first number of an HARQ process used by a single codeword scheduled by using the DCI, where a quantity of values of the first number is greater than a quantity of values of a second number of an HARQ process used by either one codeword of the DCI (that is the dual-codeword DCI) used to schedule two codewords.

In one embodiment, a value range of the second number is a proper subset of a value range of the first number.

The first number may represent an HARQ process number used by the single codeword scheduled by using the DCI. For example, when the first number scheduled by using the DCI is 0, a transmit end waits for acknowledgement information corresponding to data that sends the HARQ process number of 0. When receiving an acknowledgement ACK or a negative acknowledgement ACK corresponding to the HARQ process number of 0, the transmit end determines to clear a buffer corresponding to the HARQ process number of 0 or retransmit a redundancy version of previous data.

In this embodiment of this application, a total quantity of HARQ processes used by the single codeword scheduled by using the single-codeword DCI may be increased, so that the total quantity of the HARQ processes used by the single codeword is greater than a quantity of HARQ processes used by either one codeword of the dual-codeword DCI. For example, the quantity of HARQ processes used by the previous single codeword may be changed from 8 to 16. For example, a quantity of bits of a field used to indicate an HARQ number used by the single codeword may be increased to increase the total quantity of HARQ processes used by the codeword scheduled by using the single-codeword DCI.

In one embodiment, the quantity of the HARQ processes used by the single codeword scheduled by using the single-codeword DCI is equal to a sum of quantities of HARQ processes used by all codewords of the dual-codeword DCI. In one embodiment, the HARQ processes of two codewords in the dual-codeword DCI are renumbered to form the HARQ process corresponding to the single-codeword DCI.

It may be understood that multiple codewords in this application are described by using two codewords as an example. The solution in this application is still applicable if the multiple codewords are more than two codewords.

320: The network device sends the DCI to the terminal device.

In one embodiment, in a possible implementation, when the DCI includes indication information used to indicate the single codeword scheduled by using the DCI, the network device determines whether the codeword 0 or the codeword 1 is currently scheduled, and then generates a corresponding field in the corresponding DCI.

In one embodiment, when there is a correspondence between the single codeword scheduled by using the DCI and a first resource, and the first resource is related to a downlink control channel PDCCH configured to transmit the DCI, the network device determines whether the codeword 0 or the codeword 1 is currently scheduled, and then generates or sends, based on a first resource corresponding to the codeword 0 or the codeword 1, the PDCCH by using the first resource.

Correspondingly, the terminal device receives the DCI sent by the network device, and determines, based on the DCI, a codeword scheduled by using the DCI.

Specifically, the DCI may be carried through a downlink control channel (PDCCH), an enhanced downlink control channel (EPDCCH), or another channel having a function of carrying scheduling physical layer resource information, such as a random access response (Random Access Response, RAR) message. This is not limited in this application.

Specifically, the first resource may further include a resource of another channel having a function of carrying scheduling physical layer resource information. In other words, when the resource of the another channel having a function of carrying scheduling physical layer resource information is used to carry the DCI, there is also a correspondence between the resource of the another channel having a function of carrying scheduling physical layer resource information and the codeword scheduled by using the DCI.

After receiving the PDCCH, the terminal device may identify a PDCCH resource or indication information (that is, the codeword indication field described above) in the DCI, and determines, specifically based on the PDCCH resource that carries the DCI or based on the indication information included in the DCI, the codeword scheduled by using the DCI, that is, determines a codeword that is sent or received.

330: Optionally, the network device sends the downlink data to the terminal device based on the DCI.

Specifically, when the DCI is downlink scheduling information or a DL grant, the network device may send the downlink data to the terminal device based on the downlink scheduling information or the DL grant. Specifically, in a CoMP scenario, the first network device and/or the second network device in the foregoing description may jointly send the downlink data to the terminal device.

340: Optionally, the terminal device sends an ACK or a NACK that corresponds to data corresponding to the single codeword scheduled by using the DCI to the network device.

One HARQ process may process only one transport block (TB) at a same transmission time interval (TTI). The TTI is a time unit of a single scheduling transmission duration, and may be a slot, a mini-slot, a subframe, a symbol, a plurality of symbols, a plurality of aggregated slots, or the like. This is not limited in this application. Specifically, when receiving first downlink data sent by the first network device and/or second downlink data sent by the second network device, and determining that the received first downlink data and/or second downlink data has no error, the terminal device may correspondingly send the ACK to the first network device and/or the second network device. When not receiving the first downlink data sent by the first network device and/or the second downlink data sent by the second network device, or determining that the received first downlink data and/or second downlink data has an error, the terminal device may correspondingly send the NACK to the first network device and/or the second network device.

350: Optionally, the terminal device sends the uplink data to the network device based on the DCI.

Specifically, when the DCI is uplink scheduling information or an UL grant, the terminal device may send the uplink data to the terminal device based on the uplink scheduling information or the UL grant. Specifically, in a CoMP scenario, the first network device and/or the second network device in the foregoing description may jointly receive the uplink data sent by the terminal device.

360: Optionally, the network device sends an ACK or a NACK that corresponds to data corresponding to the single codeword scheduled by using the DCI to the terminal device.

Specifically, when receiving the uplink data sent by the terminal device, and determining that the received uplink data has no error, the first network device and/or the second network device may correspondingly send the ACK to the terminal device. When not receiving the uplink data sent by the terminal device, or determining that the received uplink data has an error, the network device may correspondingly send the NACK to the terminal device. Specifically, the uplink data may be the first uplink data or the second uplink data in the foregoing description. To avoid repetition, details are not described herein again.

Figure 4:
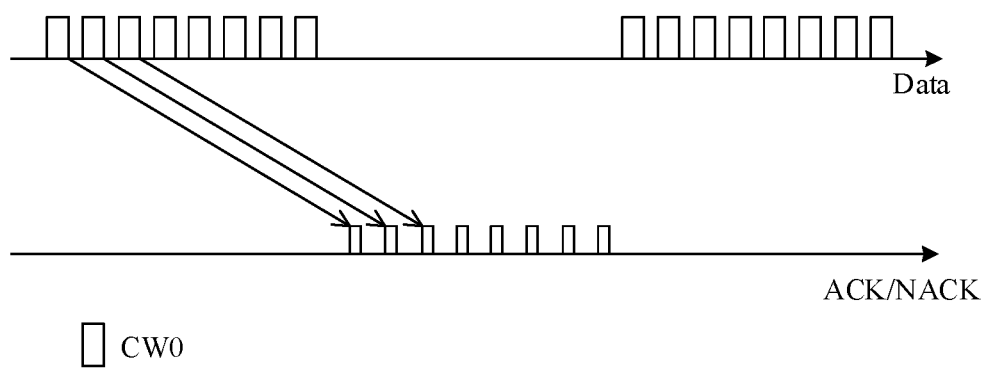
FIG. 4 is a schematic diagram of feeding back an ACK/NACK in the prior art.

FIG. 4 is a schematic diagram of feeding back an ACK/NACK in the prior art. Specifically, a device that sends the ACK/NACK in FIG. 4 may be the first network device, the second network device, or the terminal device shown in FIG. 1 or FIG. 2, and data corresponding to each codeword uses a maximum of 8 HARQ processes. When data transmission is performed by using the single-codeword DCI in the prior art, and pre-scheduling latency is greater than a length of 8×TTI, all HARQ processes corresponding to a CW0 cannot receive the ACK/NACK within the 8 TTIs, so that all HARQ processes are suspended and the data transmission is interrupted. Because all codewords used by an LTE system by default are CW0s, the uplink data or the downlink data in this case cannot be continuously sent, so that an HARQ resource is wasted, and a transmission rate of the downlink data or the uplink data may be further limited.

Figure 5:
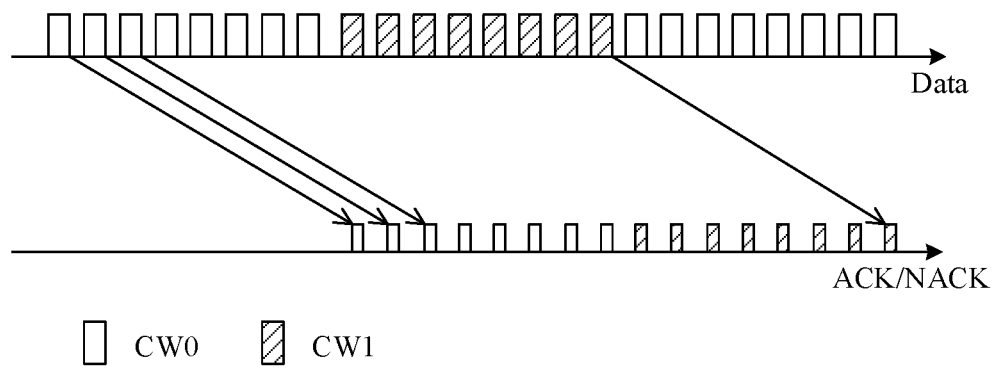
FIG. 5 is a schematic diagram of feeding back an ACK/NACK according to an embodiment of this application.

FIG. 5 is a schematic diagram of feeding back an ACK/NACK according to an embodiment of this application. Specifically, a device that sends the ACK/NACK in FIG. 5 may be the first network device, the second network device, or the terminal device shown in FIG. 1 or FIG. 2, and data corresponding to each codeword uses a maximum of 8 HARQ processes.

In this embodiment of this application, a codeword type of a single codeword scheduled by using single-codeword DCI may be directly or indirectly indicated. For example, in FIG. 4, the first 8 TTIs may be instructed to transmit a codeword 0 (CW0) and the last 8 TTIs may be instructed to transmit a codeword 1 (CW1). In this embodiment of this application, when all HARQ processes corresponding to the CW0 are suspended, CW1 may further be scheduled by using the DCI. Because the terminal device is capable of sending or receiving two codewords, when all HARQ processes corresponding to the CW0 are suspended, an HARQ entity in the terminal device may further support the ACK/NACK feedback for 8 TTIs corresponding to the CW1. It should be noted that FIG. 4 is merely an example, and an effect of this embodiment of this application may be achieved by time division scheduling of the CW0 and the CW1 at different scheduling times.

In another implementation, the DCI includes a first number of a hybrid automatic repeat request HARQ process used by data corresponding to a single codeword scheduled by using the DCI, where a quantity of values of the first number is greater than a quantity of values of a second number of an HARQ process used by data corresponding to either one codeword of the DCI used to schedule two codewords. Therefore, in this embodiment of this application, a total quantity of HARQ processes used by the data corresponding to the single codeword scheduled by using the single-codeword DCI may be increased. In this way, by increasing the quantity of HARQ processes of the single codeword, the problem of HARQ process suspension may be resolved in an IP-RAN scenario in which backhaul latency is relatively large, and a transmission rate of downlink data or uplink data is further improved.

Therefore, in this embodiment of this application, when the uplink data or the downlink data is scheduled by using the DCI, information of the single codeword scheduled by using the DCI is indirectly or directly indicated, so that the terminal may perform data transmission by using different codewords, or the quantity of HARQ processes of the data corresponding to the single codeword may be increased in this embodiment of this application. Therefore, in this embodiment of this application, a utilization rate of an HARQ resource may be improved in an IP-RAN scenario in which backhaul latency is relatively large, and the problem of HARQ suspension during joint reception or joint transmission is resolved.

In addition, because the terminal device itself is capable of receiving two codewords and correspondingly has an HARQ buffer of two codewords, complexity of the terminal device is not increased in this embodiment of this application.

The information transmission interaction solution of the embodiments of this application is described above with reference to FIG. 1 to FIG. 5, and a communications apparatus provided by the embodiments of this application is further described below with reference to FIG. 6 to FIG. 8.

Figure 6:
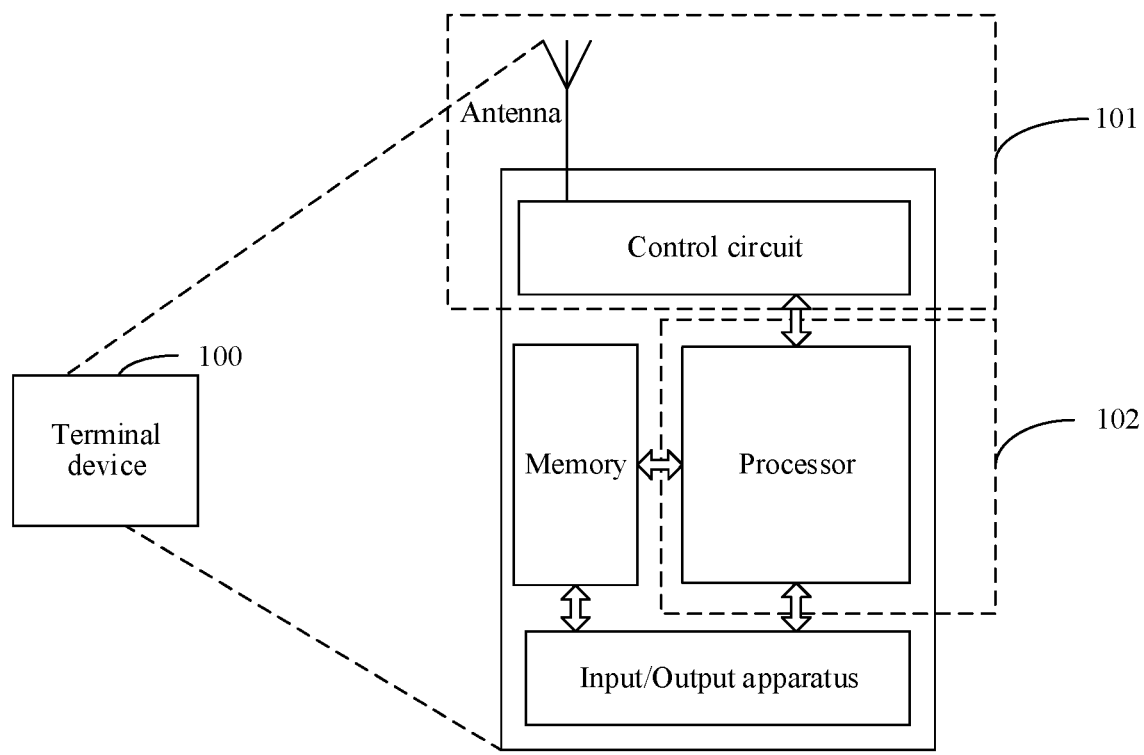
FIG. 6 is a schematic structural diagram of a terminal device according to an embodiment of this application.

FIG. 6 is a schematic structural diagram of a terminal device according to an embodiment of this application. The terminal device may be applicable to the system shown in FIG. 1 or FIG. 2. For ease of description, FIG. 6 shows only a main means of the terminal device. As shown in FIG. 6, the terminal device 100 includes: a processor, a memory, a control circuit, an antenna, and an input/output apparatus. The processor is mainly configured to process a communication protocol and communication data, control the entire terminal device, execute a software program, and process data of the software program. For example, the processor is configured to support the terminal device in executing an action described in the foregoing method embodiment, such as receiving downlink control information DCI from a network device, where the DCI includes indication information used to indicate a single codeword scheduled by using the DCI, or a correspondence between a single codeword scheduled by using the DCI and a first resource; or the DCI includes a first number of a hybrid automatic repeat request HARQ process corresponding to a single codeword scheduled by using the DCI, where a quantity of values of the first number is greater than a quantity of values of a second number of an HARQ process used by either one codeword of DCI used to schedule two codewords. The control circuit is mainly configured to convert a baseband signal and a radio frequency signal, and process the radio frequency signal. The control circuit together with the antenna may also be referred to as a transceiver, mainly configured to send and receive a radio frequency signal in an electromagnetic wave form, for example, receive downlink data or send uplink data based on the DCI. The input/output apparatus, such as a touchscreen, a display, or a keyboard, is mainly configured to receive data entered by a user and output data to the user.

After the terminal device is turned on, the processor may read the software program stored in a storage unit, interpret and execute an instruction of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends the radio frequency signal outwards in a form of electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 6 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to control the entire terminal device, execute a software program, and process data of the software program. The processor in FIG. 6 may integrate functions of the baseband processor and the central processing unit. A person skilled in the art may understand that the baseband processor and the central processing unit may separately be independent processors, and are technologically interconnected by using a bus. A person skilled in the art may understand that the terminal device may include a plurality of baseband processors, to adapt to different network standards. The terminal device may include a plurality of central processing units, to enhance a processing capability of the terminal device. Means of the terminal device may be connected to each other by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be set in the processor, or may be stored in the storage unit in a software program form. The processor executes the software program, to implement a baseband processing function.

In this embodiment of the present invention, the antenna and the control circuit having a sending and receiving function may be considered as a transceiver unit 101 of the terminal device 100, for example, configured to support the terminal device in performing a receiving function as described in FIG. 3, and the processor having a processing function may be considered as a processing unit 102 of the terminal device 100. As shown in FIG. 6, the terminal device 100 includes the transceiver unit 101 and the processing unit 102. The transceiver unit may also be referred to as a transceiver, a transceiver machine, a transceiver apparatus, and the like. Optionally, a component configured to implement a receiving function in the transceiver unit 101 may be considered as a receiving unit, and a component configured to implement a sending function in the transceiver unit 101 may be considered as a sending unit. That is, the transceiver unit 101 includes the receiving unit and the sending unit. The receiving unit may also be referred to as a receiver, an input port, a receiving circuit, or the like. The sending unit may be referred to as a transmitting machine, a transmitter, a transmitting circuit, or the like.

The processing unit 102 may be configured to execute an instruction stored in the memory, to control the transceiver unit 101 to receive a signal and/or send a signal, and to perform the function of the terminal device in the foregoing method embodiment. In an implementation, a function of the transceiver unit 101 may be considered to be implemented by a transceiver circuit or dedicated transceiver chip.

Figure 7:
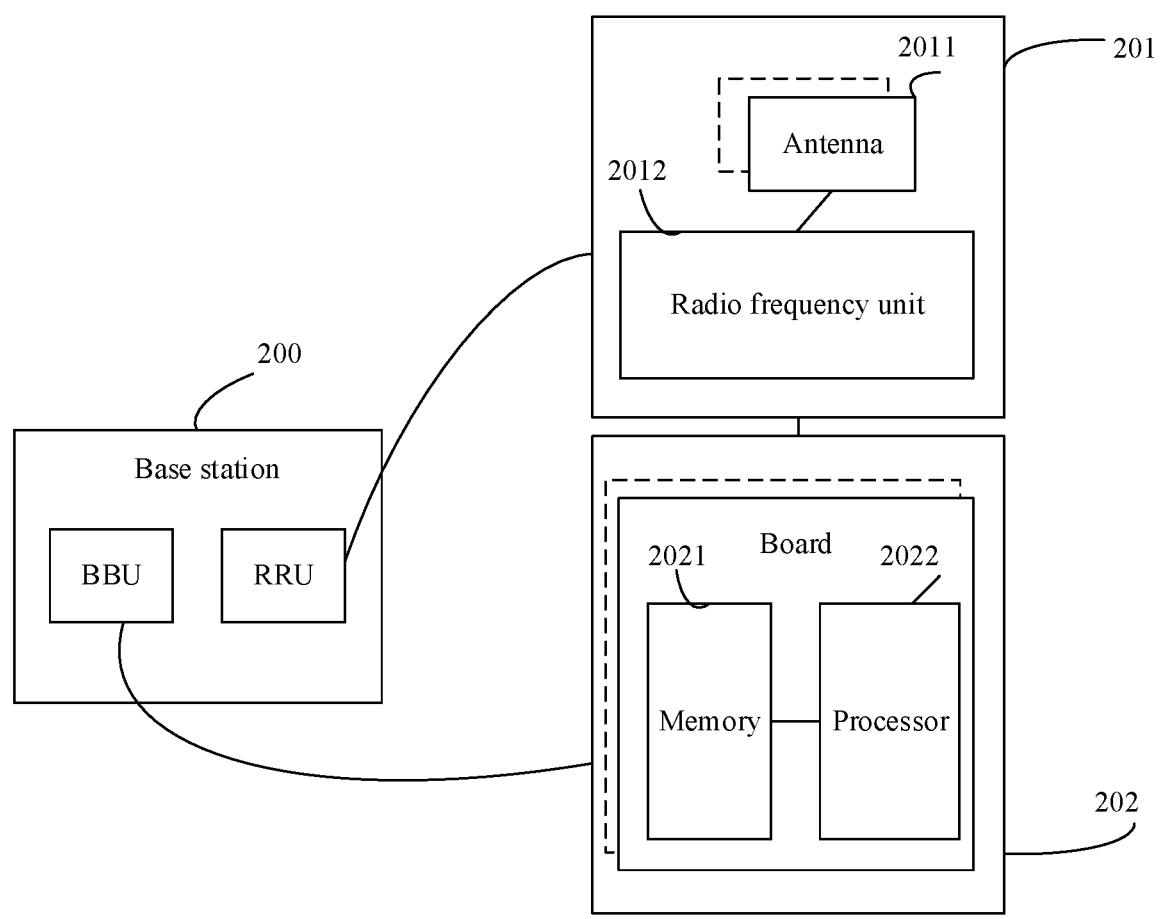
FIG. 7 is a schematic structural diagram of a network device according to an embodiment of this application.

FIG. 7 is a schematic structural diagram of a network device according to an embodiment of this application, such as a schematic structural diagram of a base station. As shown in FIG. 7, the base station may be applied to the system as shown in FIG. 3, to perform the function of the network device in the foregoing method embodiment. The base station 200 includes one or more radio frequency units, such as a remote radio unit (RRU) 201 and one or more baseband units (BBU) (also referred to as a digital unit (DU)) 202. The RRU 201 may be referred to as a transceiver unit, a transceiver machine, a transceiver circuit, a transceiver, or the like, and may include at least one antenna 2011 and a radio frequency unit 2012. The RRU 201 is mainly configured to send and receive a radio frequency signal, and convert the radio frequency signal and a baseband signal. For example, the RRU 201 is configured to send the signaling message described in the foregoing embodiment to the terminal device. The BBU 202 is mainly configured to perform baseband processing, control the base station, and the like. The RRU 201 and the BBU 202 may be physically disposed together, or may be physically disposed separately, that is, a distributed base station.

The BBU 202 is a control center of the base station, or may be referred to as a processing unit, and is mainly configured to complete a baseband processing function, for example, channel coding, multiplexing, modulation, and spectrum spreading. For example, the BBU (the processing unit) may be configured to control the base station to perform an operating procedure of the network device in the foregoing method embodiment.

In an example, the BBU 202 may include one or more boards. A plurality of boards may jointly support a radio access network (for example, an LTE network) of a single access standard, or may separately support radio access networks (for example, an LTE network, a 5G network, or another network) of different access standards. The BBU 202 further includes a memory 2021 and a processor 2022. The memory 2021 is configured to store a necessary instruction and necessary data. For example, the memory 2021 stores the correspondence between the state of the indication information and the corresponding meaning, and/or the correspondence between the codeword and the first resource in the foregoing embodiment. The processor 2022 is configured to control the base station to perform a necessary action, for example, configured to control the base station to perform an operating procedure of the network device in the foregoing method embodiment. The memory 2021 and the processor 2022 may serve one or more boards. That is, the memory and the processor may be individually disposed on each board. Alternatively, the plurality of boards may share a same memory and a same processor. In addition, a necessary circuit may be further disposed on each board.

Figure 8:
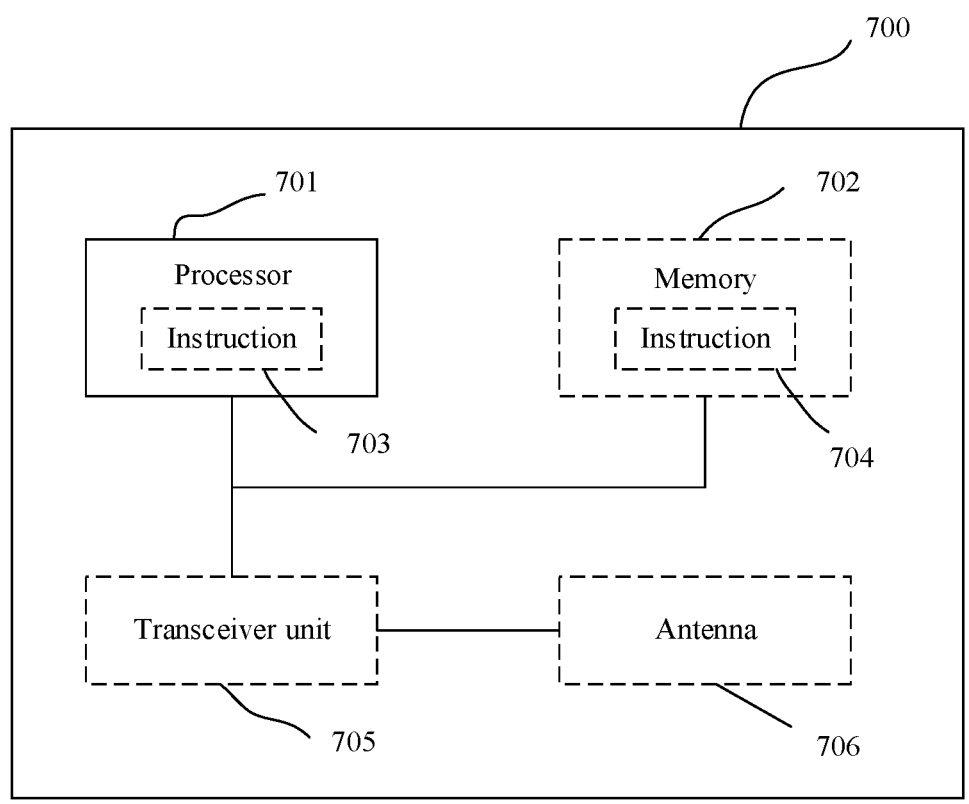
FIG. 8 is a schematic structural diagram of a communications apparatus.

FIG. 8 is a schematic structural diagram of a communications apparatus 700. The apparatus 700 may be configured to implement the method described in the foregoing method embodiment. For details of the method, refer to the description in the foregoing method embodiment. The communications apparatus 700 may be a chip, a network device (for example, a base station), a terminal device, another network device, or the like.

The communications apparatus 700 includes one or more processors 701. The processor 701 may be a general-purpose processor, a special-purpose processor, or the like. For example, the processor 701 may be a baseband processor or a central processing unit. The baseband processor may be configured to process a communication protocol and communication data, and the central processing unit may be configured to control the communications apparatus (for example, the base station, the terminal, or the chip), execute a software program, and process data of the software program. The communications apparatus may include a transceiver unit configured to input (receive) and output (send) a signal. For example, the communications apparatus may be a chip, and the transceiver unit may be an input and/or output circuit of the chip, or a communications interface. The chip may be used for a terminal, a base station, or another network device. For another example, the communications apparatus may be a terminal, a base station, or another network device, and the transceiver unit may be a transceiver, a radio frequency chip, or the like.

The communications apparatus 700 includes one or more processors 701, and the one or more processors 701 may implement the method of the network device or the terminal device in the embodiments shown in FIG. 1 to FIG. 5.

In one embodiment, the communications apparatus 700 may be configured to generate downlink control information DCI, where the DCI includes indication information used to indicate a single codeword scheduled by using the DCI, or a correspondence between a single codeword scheduled by using the DCI and a first resource; or the DCI includes a first number of a hybrid automatic repeat request HARQ process corresponding to a single codeword scheduled by using the DCI, where a quantity of values of the first number is greater than a quantity of values of a second number of an HARQ process used by either one codeword of DCI used to schedule two codewords; and send the DCI to the terminal device. The function of generating the DCI may be implemented by one or more processors. For example, the DCI may be generated by one or more processors, and sent through an interface of a transceiver, an input/output circuit, or a chip. For details of the DCI, refer to the related description of the foregoing method embodiment.

In one embodiment, the communications apparatus 700 includes a means configured to receive downlink control information DCI. For details of the DCI, refer to the related description of the foregoing method embodiment. For example, the DCI may be received through an interface of a transceiver, an input/output circuit, or a chip, and/or data may be sent and received through an interface of a transceiver, an input/output circuit, or a chip.

In one embodiment, the processor 701 may further implement other functions than the method of the embodiments shown in FIG. 1 to FIG. 5.

In one embodiment, in a design, the processor 701 may further include an instruction 703. When the instruction is run on the processor, the communications apparatus 700 is enabled to perform the method described in the foregoing method embodiment.

In one embodiment, the communications apparatus 700 may further include a circuit, and the circuit may implement the function in the foregoing method embodiment.

In one embodiment, the communications apparatus 700 may include one or more memories 702, and the memory stores an instruction 704. When the instruction is run on the processor, the communications apparatus 700 is enabled to perform the method described in the foregoing method embodiment. In one embodiment, the memory may further store data. In one embodiment, the processor may further store an instruction and/or data. For example, the one or more memories 702 may store the correspondence between the codeword and the first resource or the correspondence between the codeword and the indication information described in the foregoing embodiment, the related parameter or table in the foregoing embodiment, or the like. The processor and the memory may be separately disposed, or may be integrated together.

In one embodiment, the communications apparatus 700 may further include a transceiver unit 705 and an antenna 706. The processor 701 may be referred to as a processing unit, and controls a communications apparatus (a terminal or a base station). The transceiver unit 705 may be referred to as a transceiver machine, a transceiver circuit, or a transceiver, and is configured to implement a sending and receiving function of the communications apparatus through the antenna 706.

An embodiment of this application further provides a communications system, including the foregoing network device and one or more terminal devices.

It should be understood that in this embodiment of this application, the processor may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, operations of the foregoing methods may be implemented by using a hardware integrated logical circuit in the processor, or an instruction in a form of software. The operations of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the operations of the foregoing methods in combination with hardware of the processor. To avoid repetition, details are not described herein again.

It should further be understood that the first, the second, the third, the fourth, and various numbers in this specification are merely for differentiation for convenient description, and are not intended to limit the scope of the embodiments of this application.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that, in various embodiments of this application, an order of sequence numbers of the foregoing processes does not indicate an execution sequence. The execution sequence of the processes should be determined depending on functions and internal logic of the processes, and should not be construed as any limitation on the implementation processes of the embodiments of this application.

A person of ordinary skill in the art may be aware that, in combination with the embodiments disclosed in this specification, illustrative logical blocks and operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate means may or may not be physically separate, and means displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The first computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   generating downlink control information (DCI), wherein the DCI is to schedule downlink data during a joint transmission and includes a field indicating that single transport block scheduled by using the DCI is a first transport block of two or more transport blocks and wherein the DCI comprises at least one of the following: indication information used to indicate single transport block scheduled by using the DCI, or a correspondence between the single transport block and a first resource,
   a first number of a hybrid automatic repeat request (HARQ) process corresponding to single transport block scheduled by using the DCI, wherein a quantity of values of the first number is greater than a quantity of values of a second number of the HARQ process used by either one transport block of two transport blocks scheduled by another DCI; and
   sending the DCI to a terminal device.

2. The method according to claim 1, wherein the DCI further comprises at least one of a modulation and coding scheme information, a new data indicator information, a redundancy version information, a precoding and transport layer indication information, a code block group (CBG) indication information, a rank indication (RI) information, or a resource allocation information that corresponds to the single transport block.

3. The method according to claim 1, wherein the indication information is joint coding information, and the joint coding information is further used to indicate at least one piece of other information than the indication information in the DCI, wherein the at least one piece of other information is at least one of the following information: a modulation and coding scheme information, a new data indicator information, a redundancy version information, a precoding and transport layer indication information, a code block group (CBG) indication information, a rank indication RI information, or a resource allocation information.

4. The method according to claim 1, wherein the first resource satisfies one of the following:
   the first resource is a physical downlink control channel (PDCCH) resource configured to transmit the DCI;
   the first resource is a scrambling resource used to scramble the PDCCH that transmits the DCI; or
   the first resource is related to the PDCCH configured to transmit the DCI.

5. The method according to claim 1, wherein a value range of the second number is a proper subset of a value range of the first number.

6. A communications apparatus, comprising
   a processor, wherein the processor is coupled to a memory, and the processor is configured to execute a program or an instruction stored in the memory, causing the communications apparatus to perform the following:
   generating downlink control information (DCI), wherein the DCI is to schedule downlink data during a joint transmission and includes a field indicating that single transport block scheduled by using the DCI is a first transport block of two or more transport blocks and wherein the DCI comprises at least one of the following: indication information used to indicate single transport block scheduled by using the DCI, or a correspondence between the single transport block scheduled by using the DCI and a first resource, or
   a first number of a hybrid automatic repeat request (HARQ) process corresponding to single transport block scheduled by using the DCI, wherein a quantity of values of the first number is greater than a quantity of values of a second number of the HARQ process used by either one transport block of two transport blocks scheduled by another DCI; and
   sending the DCI to a terminal device.

7. The apparatus according to claim 6, wherein the DCI further comprises at least one of a modulation and coding scheme information, a new data indicator information, a redundancy version information, a precoding and transport layer indication information, a code block group (CBG) indication information, a rank indication (RI) information, or a resource allocation information that corresponds to the single transport block.

8. The apparatus according to claim 6, wherein the indication information is joint coding information, and the joint coding information is further used to indicate at least one piece of other information than the indication information in the DCI, wherein the at least one piece of other information is at least one of the following information: a modulation and coding scheme information, a new data indicator information, a redundancy version information, a precoding and transport layer indication information, a code block group (CBG) indication information, a rank indication RI information, or a resource allocation information.

9. The apparatus according to claim 6, wherein the first resource satisfies one of the following:
   the first resource is a physical downlink control channel (PDCCH) resource configured to transmit the DCI;

the first resource is a scrambling resource used to scramble the PDCCH that transmits the DCI; or the first resource is related to the PDCCH configured to transmit the DCI.

10. The apparatus according to claim 6, wherein a value range of the second number is a proper subset of a value range of the first number.

11. A communications apparatus, comprising a processor, wherein the processor is coupled to a memory, and the processor is configured to execute a program or an instruction stored in the memory, causing the communications apparatus to perform the following:

receiving downlink control information (DCI) from a network device, wherein the DCI is to schedule downlink data during a joint transmission and includes a field indicating that single transport block scheduled by using the DCI is a first transport block of two or more transport blocks and wherein the DCI comprises at least one of the following: indication information used to indicate single transport block scheduled by using the DCI, or a correspondence between the single transport block scheduled by using the DCI and a first resource, or a first number of a hybrid automatic repeat request (HARQ) process corresponding to single transport block scheduled by using the DCI, wherein a quantity of values of the first number is greater than a quantity of values of a second number of the HARQ process used by one transport block of two transport blocks scheduled by another DCI; and receiving downlink data or sending uplink data based on the DCI.

12. The apparatus according to claim 11, wherein the DCI further comprises at least one of a modulation and coding scheme information, a new data indicator information, a redundancy version information, a precoding and transport layer indication information, a code block group (CBG) indication information, a rank indication (RI) information, or a resource allocation information that corresponds to the single transport block.

13. The apparatus according to claim 11, wherein the indication information is joint coding information, and the joint coding information is further used to indicate at least one piece of other information than the indication information in the DCI, wherein the at least one piece of other information is at least one of the following information: a modulation and coding scheme information, a new data indicator information, a redundancy version information, a precoding and transport layer indication information, a code block group (CBG) indication information, a rank indication RI information, or a resource allocation information.

14. The apparatus according to claim 11, wherein the first resource satisfies one of the following:

the first resource is a physical downlink control channel (PDCCH) resource configured to carry the DCI;

the first resource is a scrambling resource used to scramble the PDCCH that carries the DCI;

the first resource is related to the PDCCH configured to carry the DCI.

15. The apparatus according to claim 11, wherein a value range of the second number is a proper subset of a value range of the first number.

* * * * *

UNITED STATES PATENT AND TRADEMARK OFFICE
CERTIFICATE OF CORRECTION

PATENT NO. : 11,528,099 B2
APPLICATION NO. : 16/786592
DATED : December 13, 2022
INVENTOR(S) : Haibao Ren et al.

It is certified that error appears in the above-identified patent and that said Letters Patent is hereby corrected as shown below:

In the Claims

In Claim 1, Column 25, Lines 49-50, delete "a first resource, a first number" and insert --a first resource, or a first number--.

In Claim 14, Column 28, Lines 26-27, delete "the DCI; the first resource" and insert --the DCI; or the first resource--.

Signed and Sealed this
Twenty-first Day of March, 2023

Katherine Kelly Vidal
*Director of the United States Patent and Trademark Office*